(12) United States Patent
Weichholdt et al.

(10) Patent No.: US 7,871,320 B2
(45) Date of Patent: Jan. 18, 2011

(54) THRESHER BASKET ARRANGEMENT FOR A COMBINE

(75) Inventors: Dirk Weichholdt, Woelfling les Sarreguemines (FR); Lutz Bischoff, Nünschweiler (DE); Fritz K. Lauer, Krähenberg (DE)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 12/127,218

(22) Filed: May 27, 2008

(65) Prior Publication Data
US 2009/0075708 A1    Mar. 19, 2009

(30) Foreign Application Priority Data
Sep. 13, 2007    (DE) .................. 10 2007 043 667

(51) Int. Cl.
*A01F 12/34*    (2006.01)
*A01F 12/22*    (2006.01)
(52) U.S. Cl. ......................... 460/72; 460/110
(58) Field of Classification Search ............. 460/63, 460/71–73, 75, 76, 78, 107–110, 59; 56/14.5, 56/14.6, 16.4 R, 16.4 A, 16.4 B, 16.5
See application file for complete search history.

(56) References Cited
U.S. PATENT DOCUMENTS 1,334,910 A * 3/1920 Kuntz ..................... 460/109
1,408,770 A * 3/1922 Nelson ..................... 460/76
2,841,945 A * 7/1958 Brenner ..................... 56/122
4,478,226 A * 10/1984 Tophinke ..................... 460/69
4,501,282 A * 2/1985 Muller et al. ............... 460/114

FOREIGN PATENT DOCUMENTS

| DE | 1130640 | 5/1962 |
| DE | 1130641 | 5/1962 |
| EP | 0513574 A | 11/1992 |
| FR | 1479557 | 5/1967 |

OTHER PUBLICATIONS

European Search Report dated Jan. 28, 2009 (4 pages).

* cited by examiner

*Primary Examiner*—Thomas B Will
*Assistant Examiner*—Joan D Misa
(74) *Attorney, Agent, or Firm*—Taylor IP, P.C.

(57) ABSTRACT

A thresher basket arrangement for a combine with a thresher basket and with a harvested crop processing arrangement located ahead of the inlet to the thresher basket which includes a body with a first group of projections and a second group of projections arranged on the surface of the body, where the body can be pivoted about a pivot axis extending along the inlet side of the thresher basket between a first position in which the projections of the first group interact with the harvested crop and a second position in which a smooth guide surface interacts with the harvested crop. The body is provided with a consistent shape at least in the area of the smooth guide surface and of the projections of the first group and that it is spaced at the same distance from the pivot axis in the area of the smooth guide surface and of the projections of the first group.

4 Claims, 4 Drawing Sheets

THRESHER BASKET ARRANGEMENT FOR A COMBINE

FIELD OF THE INVENTION

The present invention relates to agricultural combines, and, more particularly, to a thresher basket.

BACKGROUND OF THE INVENTION

Agricultural combines are large machines that harvest, thresh, separate and clean agriculturally planted crop that carries corn. The clean corn gained in this way is stored in a corn tank arranged on the combine. As a rule tangential threshing arrangements are used that include a thresher basket and a thresher drum which conveys the harvested crop tangentially or axial threshing arrangements that convey the harvested crop in the axial direction with axial thresher rotors, which also interact with thresher baskets. The thresher baskets are composed of arched strips and transverse strips that leave intervening spaces between them. The thresher basket surrounds the thresher drum around one part of its circumference and encloses a slot with it through which the crop to be threshed is forced. While the harvested crop is conveyed through the slot, parts of the harvested crop are separated (that is, the corn), fall through the intervening spaces and are conducted to a cleaning arrangement. On the basis of the condition of the harvested crop certain components can be separated more or less easily, so that it is useful to be able to have the thresher basket conform to the particular crop being harvested.

FR 1 479 557 A shows a thresher basket in which the downstream region is equipped with transverse strips that provide openings between them that permit the discharge of particles of the harvested crop that had been separated. A free space is formed in the area of the intake slot that is used for the selective exchange of a smooth plate for fragile harvested crop, transverse strips for harvested crop that is difficult to separate or thresher strips for the removal of tassels from the harvested crop. The disadvantage here is seen in the fact that the exchange of the exchange component is relatively time consuming, since at first the attachment of the existing exchange component must be released, then it must be removed and replaced by another exchange component and finally to fasten the latter again.

DE 1 130 641 A describes a thresher basket with a forward thresher basket extension with a U-shaped cross section that can be pivoted about an axis extending parallel to the axis of rotation of the thresher drum in order to move it between an active position and an inactive position. The center leg of the U-shape interacts while threshing with the harvested crop in the active position while in the inactive position the thresher basket extension that was rotated through 180° is then used as a stone trap. The disadvantage here is seen in the fact that the transition of the harvested crop from the slope conveyor to the thresher basket is problematical when the thresher basket extension is inactive on the basis of the then resulting increased depth of the thresher basket extension.

DE 1 130 640 A, which is seen as forming a class, describes a forward thresher basket extension for a combine, that is connected in joints, free to pivot, about an axis extending parallel to the axis of rotation of the thresher drum. In one position of the thresher basket extension it extends the thresher basket in the forward direction and in a second position, pivoted downward, it forms a smooth guide surface for a forward span over a stone trap. In a second position a gap is provided between the guide surface and the thresher basket that is used as a stone trap, while the gap lies ahead of the thresher basket extension when the thresher basket extension is active. Then the thresher basket extension forms a forward edge that impairs the flow of harvested crop.

What is needed in the art is a thresher basket for a combine of the kind cited initially with which a flow of harvested crop is possible without any problems independently of the position of the inlet area of the thresher basket.

SUMMARY OF THE INVENTION

The present invention provides a thresher basket arrangement for a combine, with a thresher basket and a harvested crop processing arrangement located ahead of the inlet side of the thresher basket, that includes a body with projections arranged on the surface of the body, where the body can be moved about a pivot axis extending along the inlet side of the thresher basket between a first position in which the projections interact with harvested crop, and a second position in which a smooth surface interacts with the harvested crop.

Stated another way, a thresher basket arrangement for a combine includes a thresher basket and a harvested crop processing arrangement located ahead of the inlet to the thresher basket. The thresher basket interacts with a thresher drum operating in particular in tangential operation or in axial operation and includes threshing elements in a manner known in itself and a covering penetrated by numerous openings through which particles of the harvested crop (kernels) can pass and reach a cleaning system. The harvested crop processing arrangement includes a body with projections fastened to it. The body is supported in bearings, free to pivot, about a pivot axis extending along the inlet side of the thresher basket and hence parallel to the axis of rotation of the thresher drum. In this way the body can be moved between a first position in which the projections interact with the harvested crop and a second position in which the projections do not interact with the harvested crop but provide a smooth guide surface of the body. The first position of the harvested crop processing arrangement is appropriate for the removal of tassels from the harvested crop while the second position can be used for sensitive harvested crop. In the area of the guide surface and the projections the body presents a consistent shape. Moreover in the area of the projections and the guide surface the body is spaced equally distant from the pivot axis. This permits a smooth transition of the harvested crop from the slope conveyor to the thresher drum independently of the position of the crop processing arrangement since the areas of the body interacting with the harvested crop provide the same shape (cross section) and the same spacing from the pivot axis in both positions cited.

It would be possible, for example, to equip the body with a cross section in the form of an equilateral triangle or a square or with two, three or more equal convex or concave surfaces and to position the pivot axis in the center so as to form an axis of symmetry. In a preferred embodiment the body is provided with a circular cross section over its entire circumference; that is, the body is shaped in the form of a circular cylinder. In another embodiment it is sufficient that the body is in the shape of a circular segment in the area of the smooth guide surface and of the projections. In its remaining areas it can then be flattened or cut out.

In a preferred embodiment of the invention the harvested crop processing arrangement includes a first group of projections at a first position in the circumferential direction of the body and a second group of projections at a second position that are lower than the projections of the first group. This permits a third position of the harvested crop processing arrangement in which the second group of projections interacts with the harvested crop and processes it more gently than the first group of projections.

DETAILED DESCRIPTION OF THE INVENTION

Figure 1:
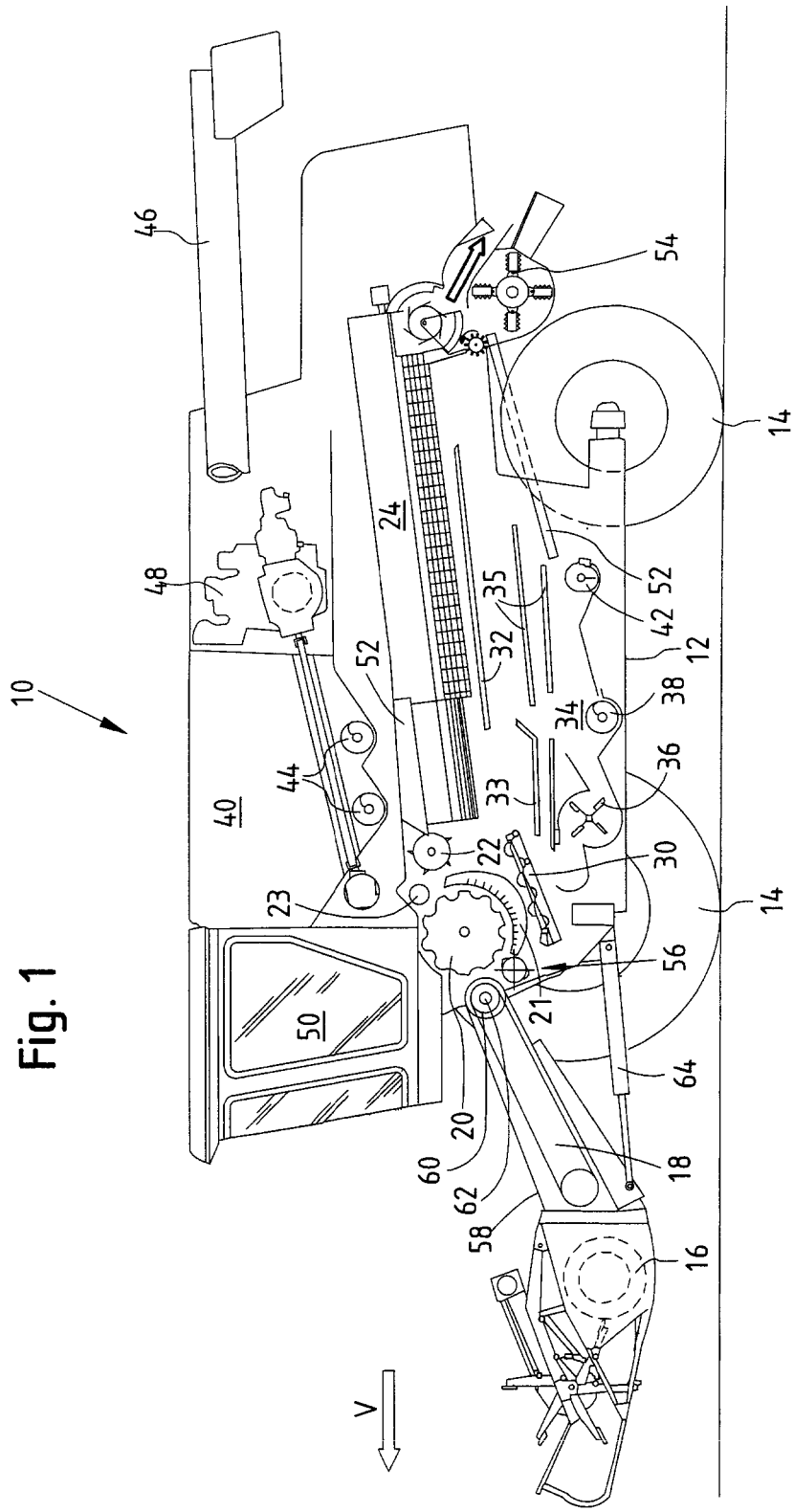
FIG. 1 shows a partial section of a side view of a combine with a first embodiment of a thresher basket arrangement.

Referring now to the drawings, and more particularly to FIG. 1, there is shown a self-propelled combine 10 with a frame 12, that is supported on the ground by front, driven wheels and rear steerable wheels 14 and is moved by these. The wheels 14 are brought into rotation by drive ways, not shown, in order to propel the combine 10, for example, across a field that is to be harvested. A harvested crop recovery arrangement in the form of a cutter head 16 is connected to the forward end region of the combine 10 in order to harvest crop from the field and to conduct it upward to a thresher arrangement by way of a slope conveyor 18. The thresher arrangement includes a thresher drum 20 arranged in the transverse direction and a thresher basket 21 associated with it to which the harvested crop is conducted first. Together with a supply housing a stripper roll 23 and a deflecting drum 22 conduct the harvested crop that has been threshed from the thresher drum 20 and the thresher basket 21 to an axial separator 24. The use of straw shakers as separators is also possible. In the following all indications of direction such as front, rear, above and below refer to the forward operating direction V of the combine 10.

Cereal crop and chaff that are separated during the threshing process fall to at least one conveyor chute 30 that conducts them to a preparation chute 33. On the other hand, cereal and chaff that leave the axial separator 24, fall to a shaker chute 32 that conducts it to the preparation chute 33 for further transfer. The preparation chute 33 delivers the threshed cereal and chaff to a cleaning arrangement 34 with sieves 35 arranged in it. This is associated with a blower 36 that supports the separation of the cereal from the chaff.

Cleaned cereal is conducted to an elevator, not shown, by way of a kernel screw conveyor 38, the elevator conducts the cereal to a corn tank 40. A return screw conveyor 42 returns parts not completely threshed out to the threshing process by way of a further elevator, not shown. The chaff is ejected at the rear of the cleaning arrangement 34 onto a shaker chute 52 that is in a shaking motion. The clean cereal in the corn tank 40 can be unloaded by way of an unloading system with transverse screw conveyors 44 and an unloading conveyor 46. The straw ejected from the axial separator 24 at a rear side is chopped together with the chaff carried along by the shaker chute 52 by way of a straw chopper 54 and distributed across the field.

The aforementioned systems are driven by way of an internal combustion engine 48. The operation of the combine 10 is controlled by an operator from an operator's cab 50. The various arrangements for threshing, cleaning, conveying and separating are located within the frame 12. The slope conveyor 18 is provided with a housing 58 that contains an upper slope conveyor roll 60, supported in bearings, free to rotate. The axis of rotation 62 of the upper slope conveyor roll 60 extends horizontally and transverse to the direction of operation and simultaneously corresponds to a pivot axis about which the slope conveyor 18 is supported in bearings, free to pivot, and connected to the frame 12 of the combine 10. This pivoting movement is accomplished by hydraulic cylinders 64. The thresher basket 21 itself is of conventional configuration and includes two arched side cheeks 66 that conform to the radius of the thresher drum 20 between which thresher strips 68 extend. The thresher basket 21 includes further arched strips, that cannot be seen in the drawings, these extend in the circumferential direction of the thresher drum 20.

Figure 2:
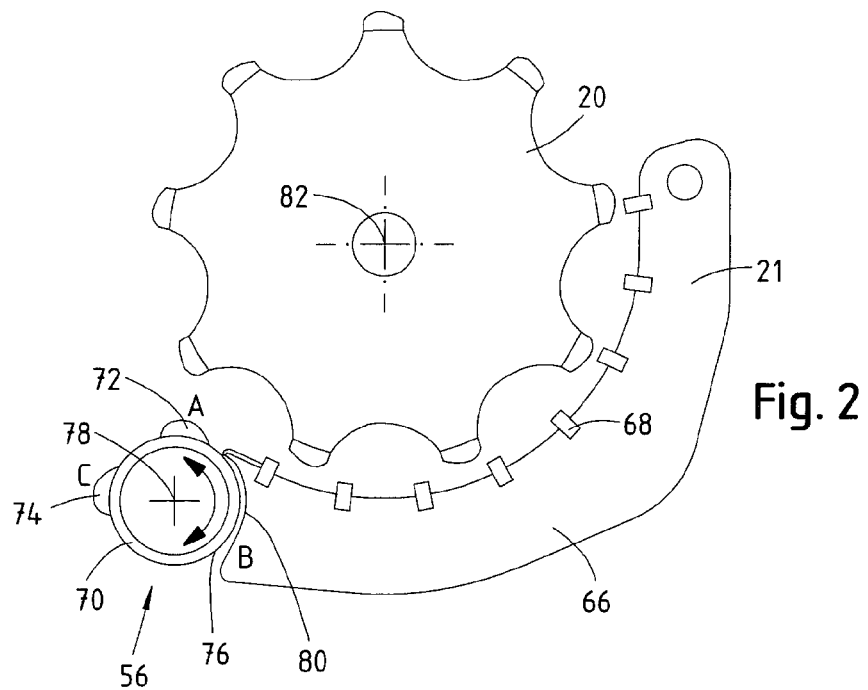
FIG. 2 shows an enlarged side view of the thresher basket of FIG. 1 with a harvested crop processing arrangement located in the first position.
Figure 3:
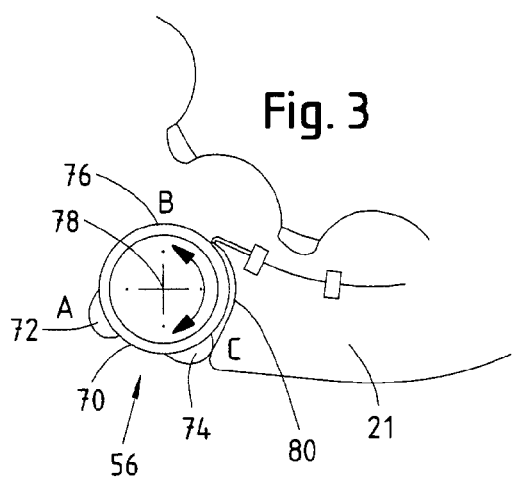
FIG. 3 shows a side view of the harvested crop processing arrangement of FIG. 2 in its second position.
Figure 4:
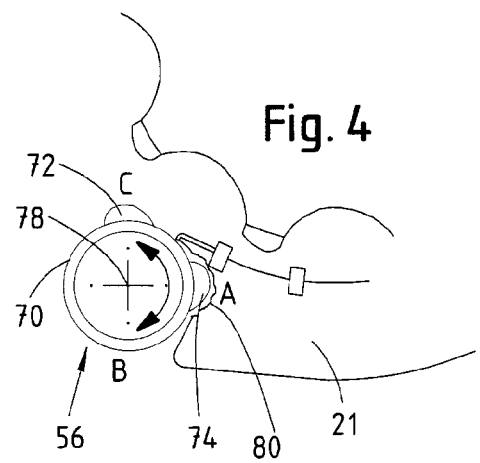
FIG. 4 shows a side view of the harvested crop processing arrangement of FIG. 2 in its third position.

As seen in the direction of the flow of the harvested crop, the thresher basket 21 is preceded by a harvested crop processing arrangement 56 which is reproduced in enlarged views in FIGS. 2 through 4. The harvested crop processing arrangement 56 includes a body 70 in the form of a circular cylinder with a first group of projections 72 that extend in the axial direction of the body 70, a second group of projections 74 that extend in the axial direction of the body 70 at a location spaced apart from the first group of projections 72 in the circumferential direction of the body 70 and a smooth guide surface 76 that extends in axial direction of the body 70 at a location spaced apart from the first group of projections 72 and the second group of projections 74 in the circumferential direction of the body 70 at a location spaced apart in the circumferential direction of the body 70. The projections 72 of the first group are higher than the projections 74 of the second group. Both groups of projections 72, 74 are composed of tassel remover strips, known in themselves, with ribs and recesses arranged between them.

The body 70 extends in the transverse direction of the thresher basket 21. It can pivot, free to rotate, about a pivot axis 78 that extends parallel to the axis of rotation 82 of the thresher drum 20. The pivot axis coincides with the axis of symmetry and its central axis and can pivot between a first position A in which the projections 72 of the first group are located on its upper side and interact with the harvested crop (see FIG. 2), a second position B in which the smooth guide surface 76 is located on its upper side (see FIG. 3) and interact with the harvested crop, and a third position C (see FIG. 4) in which the projections 74 of the second group are located on its upper side and interact with the harvested crop. In the positions cited, A, B, and C the body 70 is preferably immobilized. The rotational movement can be performed by way of an appropriate actuator or manually by the operator, where appropriate transmission devices could be provided, with which the rotational movement can be performed manually or by external forces from the operator's cab 50. The harvested crop processing arrangement 56 is arranged in a corresponding recess 80 in the side cheeks 66. Body 70 is provided with a consistent shape at least in the area of the smooth guide surface 76 and the projections 72, and body 70 can also be provided with a consistent shape in the area of projections 74. Further, body 70 is spaced an equal distance from pivot axis 78 in the area of the smooth guide surface 76 and of the projections 72, and body 70 can also be spaced an equal distance from pivot axis 78 in the area of the projections 74. Further, body 70 can be provided with a circular cross section in the area of smooth guide surface 76 and the area of projections 72, and body 70 can also be provided with a circular cross section in the area of projections 74.

A repositioning of the harvested crop processing arrangement 56 between the three positions A, B and C is possible without any problems so that an appropriate processing of the harvested crop can be attained without any difficulty. The first group 72 permits removal of tassels from harvested crop that permits such removal, that can also be accomplished in a gentler manner with the second group 74. A smooth transition of the harvested crop from the slope conveyor 18 to the threshing arrangement consisting of the thresher drum 20 and the thresher basket 21 is possible on the basis of the circular cylindrical shape of the body 70, particularly in the second position B as well. In all three positions A, B and C the harvested crop is guided smoothly and gently by the body 70 to the thresher basket.

Figure 5:
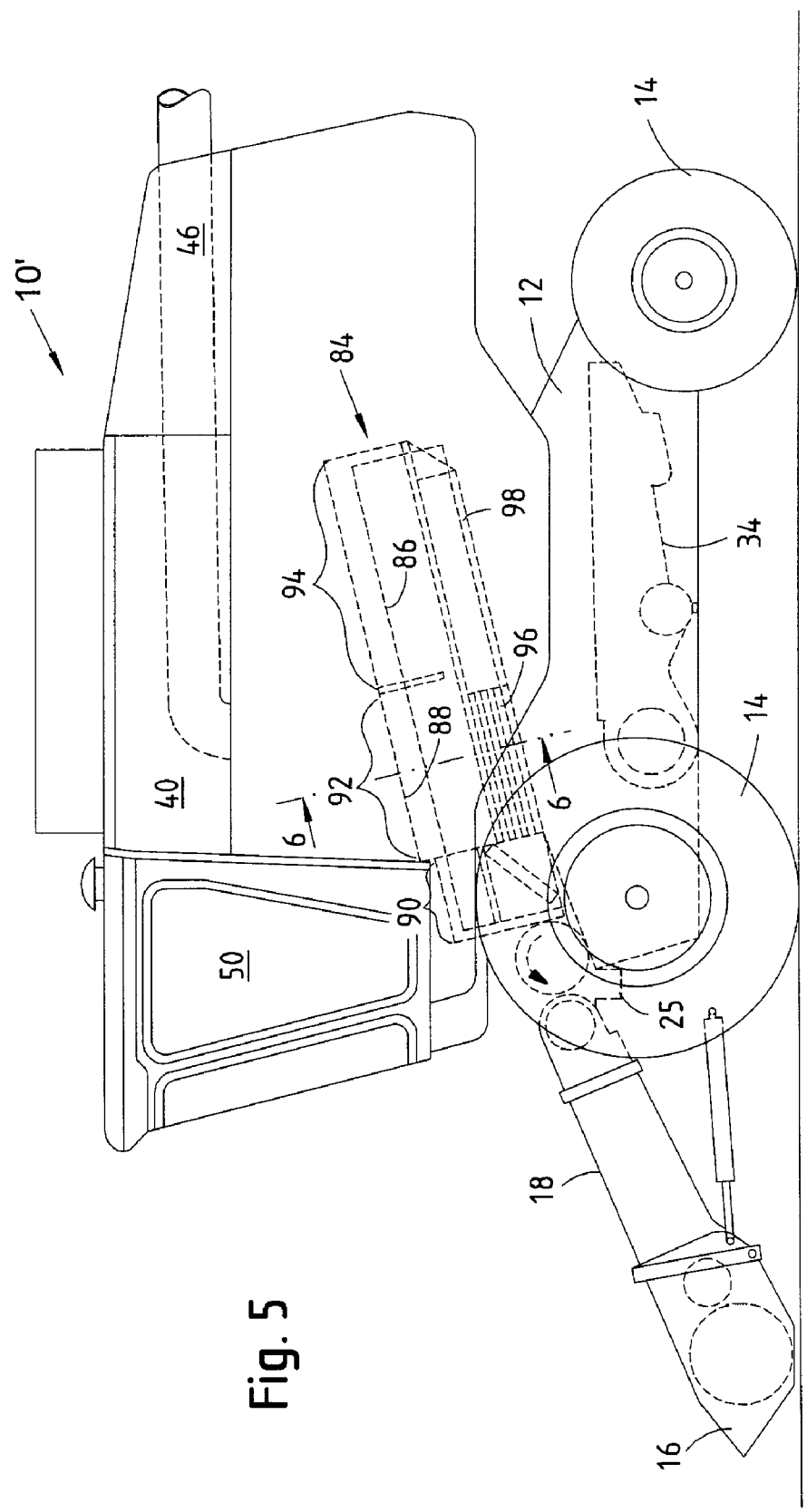
FIG. 5 shows a partial section of the side view of a combine with a second embodiment of a thresher basket arrangement.

FIG. 5 shows a side view of another combine 10', in which elements that coincide with those of the combine 10 are identified with the same part number call-outs. As an essential difference it can be seen that the combine 10', according to FIG. 5, is provided with an axial threshing and separating arrangement 84 that threshes and separates the harvested crop. The axial threshing and separating arrangement 84 includes a rotor 86 that can be brought into rotation and that is enclosed radially in a housing 88 which defines an inlet area 90, a threshing area 92 and a separating area 94 together with the rotor 86. The rotor 86 includes a hollow cylindrical drum with a multitude of crop processing elements that engage into the harvested crop and circulate it through the housing 88. The floor of the housing 88 includes a thresher basket 96 under the threshing area 92 and a separating grate 98 underneath the separating area 94.

Figure 6:
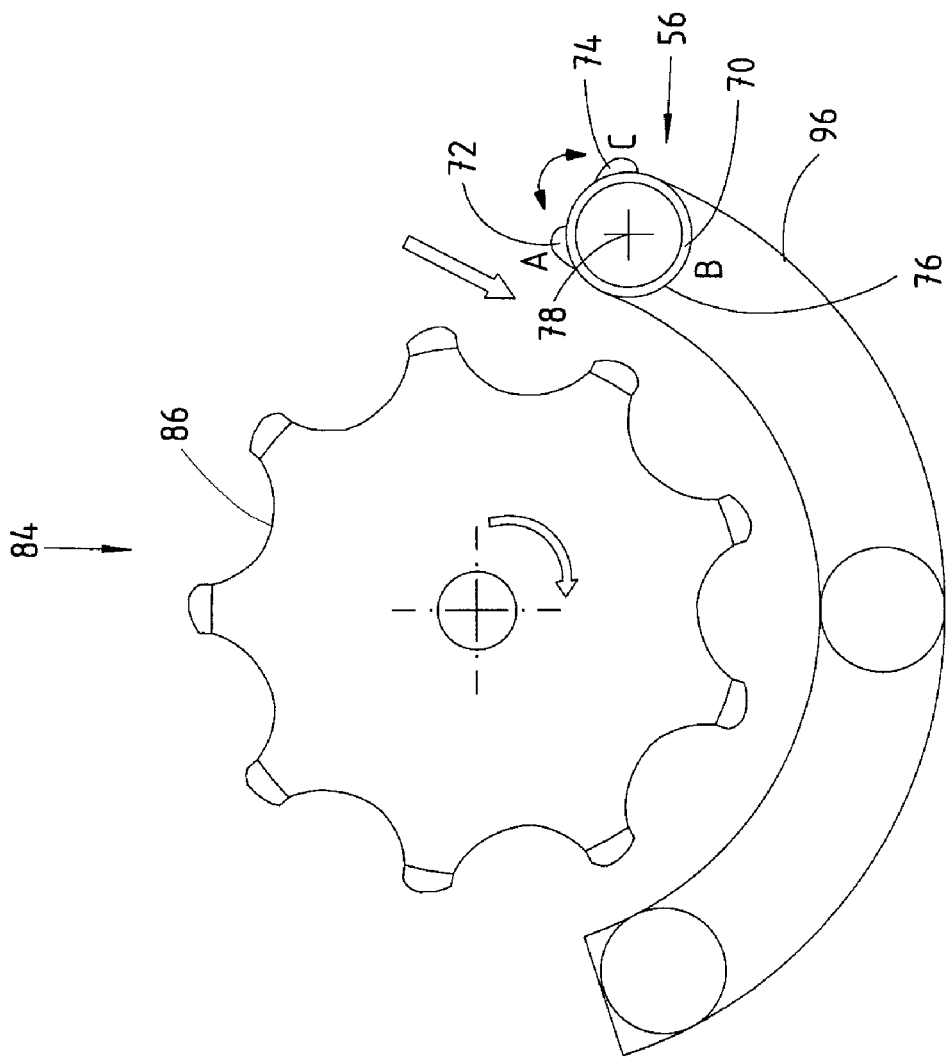
FIG. 6 shows a front view of the thresher basket arrangement of FIG. 5.

FIG. 6 shows a vertical section through the axial threshing and separating arrangement 84 in the threshing area along the line 6-6 of FIG. 5. On the inlet side (upstream relative to the direction of rotation of the rotor 86) a harvested crop processing arrangement 56 is also located ahead of the thresher basket 96, that extends in the axial direction of the rotor 86 over the entire threshing area 92 and that corresponds in its configuration, to the mechanism of its adjustment and the function to the embodiment according to FIG. 2. Accordingly the harvested crop processing arrangement 56 includes a circular cylindrical body 70 with an axis of symmetry 78 extending parallel to the axis of rotation of the rotor 86 about which the body 70 can rotate between a first position A in which a first group of projections 72 interact with the harvested crop, a second position B in which the harvested crop interacts with a smooth guide surface 76, and a third position C in which a second group of projections 74 that is lower than the first group of projections 72 interacts with the harvested crop, in order to remove the tassels.

Having described the preferred embodiment, it will become apparent that various modifications can be made without departing from the scope of the invention as defined in the accompanying claims.

NOMENCLATURE 10 combine
10' combine
12 frame
14 wheels
16 cutter head
18 slope conveyor
20 threshing drum
21 thresher basket
22 deflecting drum
23 diverter drum
24 axial separator
30 conveyor chute
32 shaker chute
33 preparation chute
34 cleaning arrangement
35 sieves
36 blower
38 kernel screw conveyor
40 corn tank
42 overhead screw conveyor
52 shaker chute
44 transverse screw conveyor
43 unloading conveyor
54 straw chopper
48 internal combustion engine
50 operator's cab
58 housing
60 upper slope conveyor roll
62 axis of rotation
64 hydraulic cylinder
66 side cheeks
68 thresher strips
70 body
72 projections, first group of projections
74 projections, second group of projections
76 smooth guide surface
78 pivot axis
82 axis of thresher drum
80 recess
10' another combine
84 axial thresher and separating arrangement
86 rotor
88 housing
90 inlet area
92 threshing area
94 separating area
96 thresher basket
98 separating grate

The invention claimed is:

1. A thresher basket arrangement for a combine, comprising:
a thresher basket including an inlet side;
a harvested crop processing arrangement located ahead of said thresher basket, said harvested crop processing arrangement including a body, a plurality of projections, and a smooth guide surface closely adjacent said thresher basket, said body including a surface on which said plurality of projections are arranged and an area of said smooth guide surface and at least one of said plurality of projections, said body being pivotable about a pivot axis substantially fixed relative to said thresher basket and extending along said inlet side of said thresher basket, said body being pivotable between a first fixed position, in which said at least one of said plurality of projections interact with a harvested crop, and a second fixed position, in which said smooth guide surface interacts with said harvested crop, said body including a consistent circular cross section shape at least in said area of said smooth guide surface and said at least one of said plurality of projections, said body being spaced at an equal distance from said pivot axis in said area of said smooth guide surface and said at least one of said plurality of projections.

2. The thresher basket arrangement according to claim 1, wherein said body includes a circular cross section over an entire circumference of said body.

3. The thresher basket arrangement according to claim 1, wherein said plurality of projections includes a first group of projections and a second group of projections, said projections of said first group being at a first location relative to a circumference of said body, said projections of said second group being at a second location relative to said circumference of said body, said projections of said second group being not as high than said projections of said first group relative to said circumference of said body.

4. A combine, comprising:
one of a thresher drum conveying tangentially and an axial thresher rotor conveying axially; and
a thresher basket arrangement that interacts with one of said thresher drum conveying tangentially and said axial thresher rotor conveying axially, said thresher basket arrangement including:
a thresher basket including an inlet side;
a harvested crop processing arrangement located ahead of said thresher basket, said harvested crop processing arrangement including a body, a plurality of projections, and a smooth guide surface closely adjacent said thresher basket, said body including a surface on which said plurality of projections are arranged and an area of said smooth guide surface and at least one of said plurality of projections, said body being pivotable about a pivot axis substantially fixed relative to said thresher basket and extending along said inlet side of said thresher basket, said body being pivotable between a first fixed position, in which said at least one of said plurality of projections interact with a harvested crop, and a second fixed position, in which said smooth guide surface interacts with said harvested crop, said body including a consistent circular cross section shape at least in said area of said smooth guide surface and said at least one of said plurality of projections, said body being spaced at an equal distance from said pivot axis in said area of said smooth guide surface and said at least one of said plurality of projections.

* * * * *